No. 872,440. PATENTED DEC. 3, 1907.
E. VON MARSÓVSZKY & J. JOBBAN.
ROUGHING CALK FOR HORSESHOES.
APPLICATION FILED JUNE 2, 1905.

UNITED STATES PATENT OFFICE.

EMERICH VON MARSÓVSZKY AND JOSEF JOBBAN, OF BUDAPEST, AUSTRIA-HUNGARY.

ROUGHING-CALK FOR HORSESHOES.

No. 872,440.  Specification of Letters Patent.  [Patented Dec. 3, 1907.

Application filed June 2, 1905. Serial No. 263,415.

*To all whom it may concern:*

Be it known that we, EMERICH VON MARSÓVSZKY, royal chief engineer, and JOSEF JOBBAN, chief veterinary surgeon and professor at the Central Honvéd Riding School, both subjects of the King of Hungary, and both residing at 10 Bulyovszky ukza, VI, in the city of Budapest, Austria-Hungary, have invented certain new and useful Improvements in Roughing-Calks for Horseshoes, of which the following is a true, full, and clear specification.

Roughing calks for horse shoes as heretofore made have the great defect that they become blunt soon after being taken in use and thus do not serve the intended purpose.

This invention relates to calks which however much they are used always remeain sharp. With this object we make the calks in the form of screws with deep and steep thread. The wear of such screw-like calks proceeds as with all other calks in the formation of surfaces approximately vertical at their longitudinal axis. But as every section vertical or nearly vertical through a screw meets the screw threads at an acute angle, it naturally follows that every screw thread must form an acute wedge-like edge at the place of section or wear, while at the same time the part of the screw adjoining the acute angled edge prevents the penetration of the edge into joints or crevices of the road.

Figure 1:
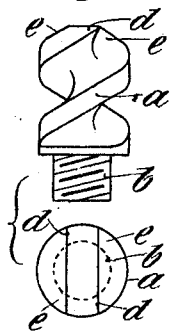
Figure 2:
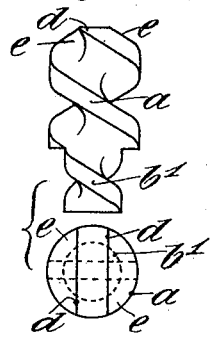
Figure 3:
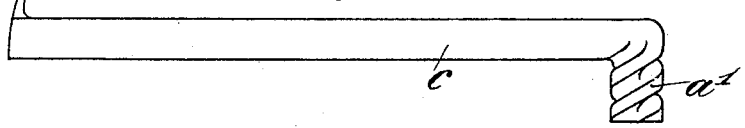
Figure 4:
Figure 5:
Figure 6:
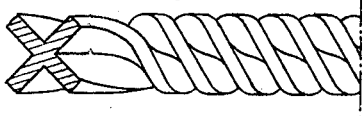

Figures 1 and 2 show in elevation and cross section two examples of such screw like calks. Fig. 3 shows an example of a screw-like calk formed on the horseshoe itself. Figs. 4, 5, and 6 show examples of various sections of iron from which such screw calks may be formed.

A shown in Figs. 1 and 2 the calk $a$ is, as preferred, made as a two-threaded right or left handed screw which for instance is made of a rectangular flat section as in Fig. 4 of iron or steel twisted around its longitudinal axis and provided with a usual screw end $b$, Fig. 1. At the outer or free end the calk is cut off square, the threads terminating into the square cut end surface or edge $d$ which, however much worn, preserves a sharp edge and only changes its direction. The parts $e$ adjoining the edge $d$ prevent the calk from sticking in joints or crevices of the road.

Instead of the usual screw end $b$, Fig. 1, we may as shown in Fig. 2 form it with a tapered steep threaded end part $b$, which of course enters a similarly screw threaded hole in the horse shoe and has the great advantage of always fixing itself in the horse shoe by the load or pressure on it, while also affording facility for being quickly put in and taken out.

As shown at $a$, in Fig. 3 the calk may be formed on the horseshoe $c$ itself, the ends of the horseshoe being suitably drawn out and then twisted into the desired form. By the application of sections with a plurality of blades as for instance three, Fig. 5, or cruciform, Fig. 6, we may of course form screws with a plurality of threads. But such screw calks may obviously be formed in other ways, such as by casting, pressing, rolling or the like, without influencing the nature of the invention. We shall only now note that the screw calks may be made one threaded, but this is not so suitable, because of offering only one small one-sided edge relatively to the diameter of the calk.

Having now described our invention, we declare, that what we claim, and desire to secure by Letters Patent, is—

1. A calk for horse-shoes consisting of a relatively deep and sharp screw thread adapted to provide a uniform bearing surface as said calk wears, substantially as and for the purpose described and set forth.

2. A calk for horse-shoes consisting of a relatively deep and sharp cylindrical screw thread adapted to provide a uniform bearing surface as said calk wears.

3. A calk for horse-shoes consisting of a plurality of relatively deep and sharp screw threads adapted to provide a uniform bearing surface as said calk wears.

4. A calk for horse-shoes consisting of a relatively deep and sharp screw thread adapted to provide a uniform bearing surface and provided at its upper end with a sharp threaded screw adapted to be screwed into the horse-shoe.

In testimony whereof we affix our signatures in the presence of two witnesses.

EMERICH VON MARSÓVSZKY.
JOSEF JOBBAN.

Witnesses:
JACOB EULMAIS,
LOUIS VANDORN.